United States Patent
Singarayan et al.

(10) Patent No.: US 10,505,847 B1
(45) Date of Patent: Dec. 10, 2019

(54) DESTINATION MAC VALIDATION PER LOGICAL INTERFACE OF A NETWORK DEVICE

(71) Applicant: Juniper Networks, Inc., Sunnyvale, CA (US)

(72) Inventors: Babu Singarayan, San Jose, CA (US); Channasangamesh S Hugar, Bangalore (IN); Avijit Basu, Bangalore (IN); Pratibha Goel, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/940,745

(22) Filed: Mar. 29, 2018

(51) Int. Cl.
*H04L 29/12* (2006.01)
*H04L 29/06* (2006.01)
*H04L 12/741* (2013.01)
*H04L 12/935* (2013.01)
*H04L 12/46* (2006.01)

(52) U.S. Cl.
CPC ............ *H04L 45/745* (2013.01); *H04L 45/54* (2013.01); *H04L 49/3009* (2013.01); *H04L 61/103* (2013.01); *H04L 61/6022* (2013.01); *H04L 69/22* (2013.01); *H04L 12/4633* (2013.01); *H04L 12/4641* (2013.01)

(58) Field of Classification Search
CPC ...... H04L 12/28; H04L 12/66; H04L 67/1078
USPC ................................................. 370/252–392
See application file for complete search history.

(56) References Cited

U.S. PATENT DOCUMENTS

| 2011/0064086 A1* | 3/2011 | Xiong | H04L 49/351 |
| | | | 370/401 |
| 2016/0050160 A1* | 2/2016 | Li | H04L 63/0442 |
| | | | 713/176 |

OTHER PUBLICATIONS

"MAC Address Validation Overview," Tech Library, JunosE Software, Juniper Networks, Inc., accessed from https://www.juniper.net/documentation/en_US/junose13.2/topics/concept/ip-mac-address-validate-overview.html, Jun. 20, 2012, 1 pp.
"Understanding Junos Fusion Ports," Tech Library, Junos OS, Junos Fusion Data Center Feature Guide, Juniper Networks, Inc., accessed from https://www.juniper.net/documentation/en_US/junos/topics/concept/fusion-ports.html, Feb. 26, 2018, 4 pp.

(Continued)

*Primary Examiner* — Iqbal Zaidi
(74) *Attorney, Agent, or Firm* — Schumaker & Sieffert, P.A.

(57) ABSTRACT

In one example, a network device includes an interface card comprising a physical network interface; a forwarding component associated with the interface card; a control unit comprising one or more processors, wherein the control unit is configured to program the forwarding component to configure sets of one or more valid media access control (MAC) addresses in association with respective logical interfaces of a plurality of logical interfaces configured for the physical interface, wherein the forwarding component is configured to identify a logical interface of the plurality of logical interfaces with which to process a packet received by the network device at the physical interface, and wherein the forwarding component is configured to, in response to a determination that the set of valid MAC addresses associated with the identified logical interface does not include a valid MAC address that matches a destination MAC address of the packet, drop the packet.

20 Claims, 3 Drawing Sheets

(56) References Cited

OTHER PUBLICATIONS

"Configuring a Pseudowire Subscriber Logical Interface Device," Tech Library, Junos OS, Broadband Subscriber Access Protocols Feature Guide, accessed from https://www.juniper.net/documentation/en_US/junos/topics/task/configuration/pseudowire-interface-device-configuring.html, Sep. 13, 2017, 3 pp.

* cited by examiner

DESTINATION MAC VALIDATION PER LOGICAL INTERFACE OF A NETWORK DEVICE

TECHNICAL FIELD

The invention relates to packet-based computer networks and, more particularly, to forwarding packets within computer networks.

BACKGROUND

A network service provider offers services to subscribers that access a service provider core network using an access network. Services offered may include, for example, traditional Internet access, Voice-over-Internet Protocol (VoIP), video and multimedia services, and security services. The service provider network may support multiple types of access network infrastructures that connect to service provider network access gateways to provide access to the offered services.

Because the access gateways are positioned near the edge of the service provider network directly upstream from the subscribers and operate to provide an operational endpoint (i.e., terminate) the subscriber connections (e.g., digital subscriber line- or cable-based connections) into the service provider network, the access gateways typically provide mechanisms for identifying subscriber traffic and providing subscriber-specific services. The access gateways apply subscriber policies to manage subscriber traffic on a per-subscriber basis as such traffic traverses the service provider core network boundary.

Network devices, such as access gateways, often include a control unit (e.g., one or more programmable processors and/or circuitry) that provides control plane functionality for the network device. In some cases, the network devices may also include a plurality of forwarding components, such as packet forwarding engines (PFEs), and an internal switch fabric that collectively provide a forwarding plane for forwarding network traffic.

Moreover, a network device may provide client devices with access to private or public layer 3 (L3) networks, such as an L3 virtual private network, the Internet, or other network. Client devices seeking to access the L3 networks address set destination layer 2 network addresses (e.g., Media Access Control (MAC) addresses) of the packets to a gateway MAC address of the network device, which identifies such packets as L3 routable and forwards the packets based on the L3 destination address.

SUMMARY

In general, this disclosure describes techniques for applying, with a network device, 'my-MAC checks' on a per logical interface basis for the network device to validate that a packet received by the network device has an L2 destination network address (e.g., destination MAC address) that matches an expected L2 destination network address for the respective logical interface.

For example, a network device, such as a gateway network router, may be configured with one or more logical interfaces for underlying physical network interfaces of the network device. In general, a logical interface (or "subinterface") represents a unit configured for a physical network interface, and each logical interface includes addressing, protocol information, and other logical interface properties that enable the physical interface to operate. A layer 2 logical interface may use the Virtual Local Area Network Identifier (VLAN-ID) as a virtual circuit identifier, and the scope of the VLAN-ID is local to the interface port. The logical interface may represent a logical tunnel interface, a pseudowire service interface, a cascade port for a distributed network device having one or more satellite devices each having one or more extended ports, or logical interfaces corresponding to VLANs transporting virtual router redundancy protocol (VRRP) sessions, as examples. When the network device receives a packet on a logical interface, the network device performs a my-MAC check that is specific to the logical interface rather than common to the physical interface. The network device may perform the my-MAC check prior to processing the packet using the ingress logical interface. In this way, the packet can be filtered if the packet passes or avoids a my-MAC check for the physical interface but is nevertheless not destined for a layer 3 routing interface for the logical interface.

The techniques may provide one or more technical advantages. For example, the techniques may permit network devices to identify packets, received at a logical interface, that should not be routed using the layer 3 interface configured for the logical interface. Therefore, even in some example implementations in which my-MAC checks for the physical interface may be disabled, the network device may nevertheless prevent unexpected packets from being routed in a layer 3 network. For logical tunnels, for instance, a network device applying techniques described herein may perform my-MAC checks at a layer 3 tunnel endpoint for a layer 3 virtual private network, the layer 3 tunnel endpoint being stitched to the layer 2 logical tunnel at the network device and therefore associated with a logical interface with respect to which the network device performs a per-logical interface my-MAC check. For a distributed network device having cascade ports and extended ports, the network device may perform a my-MAC check at the logical interface that is an extended port ingress interface. Even though the network device may skip a my-MAC check for the cascade port, traffic not destined to the extended port may nevertheless be identified and dropped to prevent such traffic from being routed on, e.g., a layer 3 virtual private network. For logical interfaces of a physical interface that are configured with corresponding VRRP sessions, assigning MACs (in this case, virtual MACs or "VMACs") per logical interface and performing my-MAC checks on a per-logical interface level may improve the ability of the VRRP application (or other application) to scale at a per-logical interface level. For example, in contrast to virtual MAC assignment at the physical interface level, the techniques may allow the network device to continue receiving traffic destined for an assigned MAC at one of the logical interfaces even when the other logical interface has been deleted, added, or restored, thereby triggering the deletion of the assigned MAC from the other logical interface. Using the described techniques, the network device may continue to identify routable traffic for the VRRP application.

In one example, a method comprises receiving, by a network device, configuration data defining a plurality of logical interfaces for a physical network interface of the network device, wherein each logical interface of the plurality of logical interfaces is associated with a different my-media access control (my-MAC) table configured within the network device, each of the my-MAC tables including one or more valid MAC addresses for the logical interface; identifying, by the network device, a logical interface of the plurality of logical interfaces with which to process a packet received by the network device at the physical interface; and in response to determining, by the network device, that the my-MAC table associated with the identified logical interface does not include a valid MAC address for the identified logical interface that matches a destination MAC address of the packet, dropping the packet.

In another example, a network device includes an interface card comprising a physical network interface; a forwarding component associated with the interface card; a control unit comprising one or more processors, wherein the control unit is configured to program the forwarding component to configure sets of one or more valid media access control (MAC) addresses in association with respective logical interfaces of a plurality of logical interfaces configured for the physical interface, wherein the forwarding component is configured to identify a logical interface of the plurality of logical interfaces with which to process a packet received by the network device at the physical interface, and wherein the forwarding component is configured to, in response to a determination that the set of valid MAC addresses associated with the identified logical interface does not include a valid MAC address that matches a destination MAC address of the packet, drop the packet.

In another example, a non-transitory computer-readable medium comprises instructions. The instructions are for causing one or more programmable processors of a network to receive configuration data defining a plurality of logical interfaces for a physical network interface of the network device, wherein each logical interface of the plurality of logical interfaces is associated with a corresponding set of valid media access control for the logical interface; identify a logical interface of the plurality of logical interfaces with which to process a packet received by the network device at the physical interface; and in response to a determination that the set of valid MAC addresses associated with the identified logical interface does not include a valid MAC address for the identified logical interface that matches a destination MAC address of the packet, drop the packet.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters refer to like elements throughout the figures and description.

DETAILED DESCRIPTION

Figure 1:
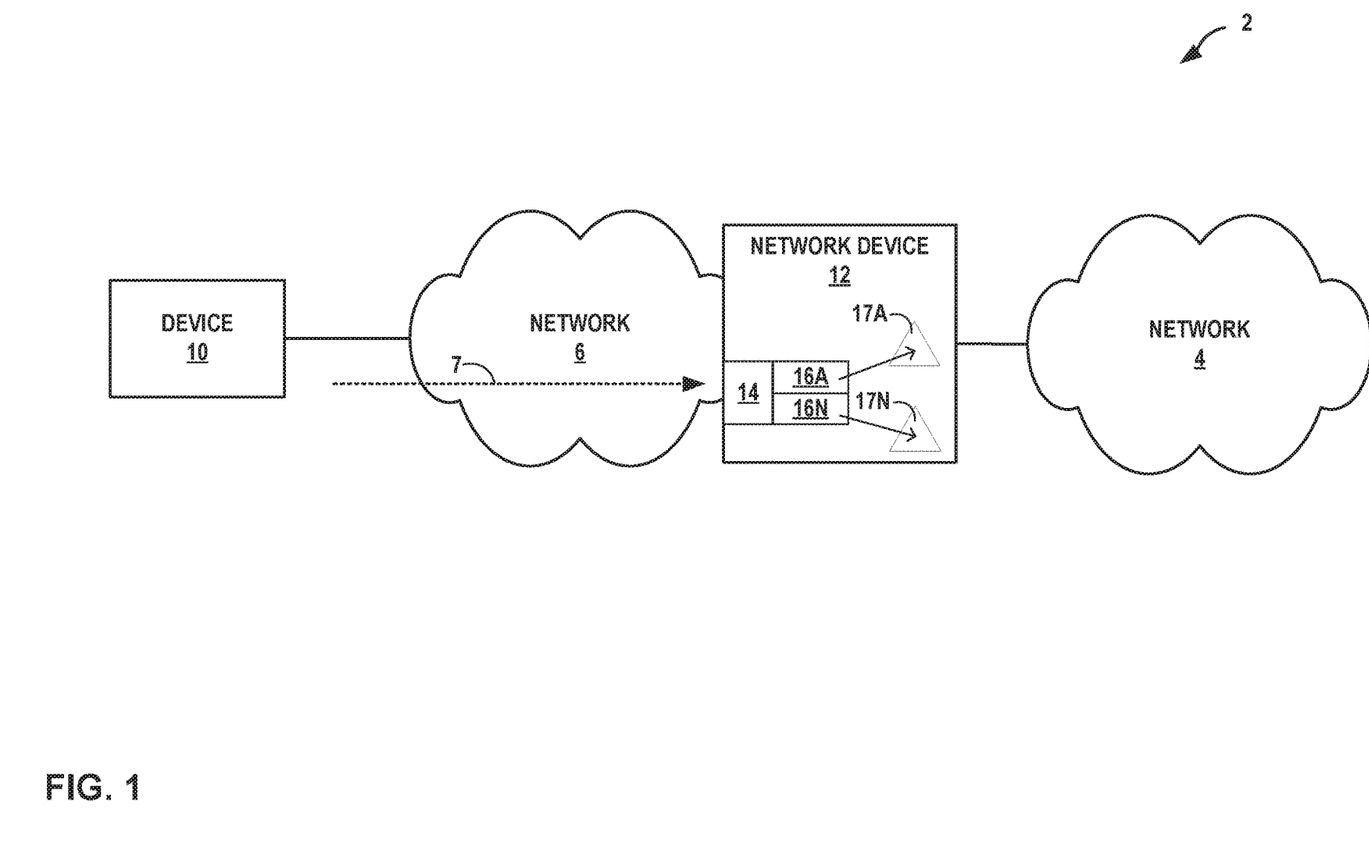
FIG. 1 is a block diagram illustrating an example network system in which a network device operates as a layer 3 access gateway, in accordance with techniques described herein.

FIG. 1 is a block diagram illustrating an example network system 2 in which network device 12 operates as a layer 3 access gateway for network 6 to network 4, in accordance with techniques described herein. In this example, network 6 may be referred to as an access network in that device 10 uses network 6 to access services provided by network system 2. Network 4 may be referred to as a core network that offers layer 3 routing and forwarding services for access to one or more other networks, such as the Internet. Network device 12 may be configured with one or more layer 3 virtual private networks that operate over network 4. Device 10 attaches to (i.e., communicates within) network system 2 via access network 6 to access services or devices provided within network 4. Network system 2 may represent a service provider network such as that provided by an Internet Service Provider or Network Service Provider (ISP/NSP).

Device 10 may be, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services of network system 2. Device 10 may be associated with a subscriber, such as an enterprise, a residential subscriber, or a mobile subscriber to an operator of network system 2. Device 10 connects to network 6 via one or more access links that may each comprise wired and/or wireless communication links. The term "communication link," as used herein, comprises any form of transport medium, wired or wireless, and can include intermediate nodes such as network devices. An access link may include, for instance, aspects of an asymmetric Digital Subscriber Line (DSL) network, cable network, a radio access network for a cellular access network, WiMAX, a T-1 line, an Integrated Service Digital Network (ISDN), or wired Ethernet.

Network 6 may aggregate data traffic from one or more devices for transport to/from network 4 of network system 2. Network 6 includes network nodes (not shown in FIG. 1) that execute communication protocols to transport control and user data to facilitate communication between device 10 and network 4. Network 6 may comprise, for example, digital subscriber line access multiplexers (DSLAMs), Ethernet aggregation devices (EADs) switches, edge routers, broadband remote access servers (BRAS), a gateway general packet radio service (GPRS) support node (GGSN) and other GPRS support node (GSNs), a Universal Mobile Telephone System (UMTS) having a UMTS Terrestrial Radio Access Network (UTRAN), and/or a 3GPP Long Term Evolution (LTE) mobile access network employing, for instance, service gateways (SGWs), packet data network gateways (PDNs), and eNodeBs, a mobile IP network, an IP network, or another type of network that provides access for device 10 to network 4. The elements of network 6 may support a variety of protocols, such as Internet Protocol (IP), Multiprotocol Label Switching (MPLS), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Device 10 may have a dedicated subscriber interface, e.g., an ATM virtual circuit (VC) or an Ethernet virtual local area network (VLAN), to access network 6.

Network 4 may represent a public network that is owned and operated by a service provider to interconnect a plurality of networks, such as network 6. Network 4 may implement Multi-Protocol Label Switching (MPLS) forwarding and in such instances may be referred to as an MPLS network. In some instances, network 4 represents a plurality of interconnected autonomous systems, such as the Internet, that offers services from one or more service providers.

In some instances, transport links couple network device 12 to network 6 and network 4. Network device 12 may be considered as located "behind" the network 6. Network device 12 may constitute a part of a backhaul network, which may include land-based transmission lines, frequently leased by a service provider, to transport data and control traffic between network 6 and network 4. The backhaul network typically also includes switches, aggregation devices, and routers. Network device 12 may represent a network edge or core router that routes network packets to/from network 6, or network device 12 may comprise an intermediate network device that transports packets between network 6 and network 4. In some embodiments, network device 12 comprises an MX-series router manufactured by Juniper Networks, Inc., of Sunnyvale, Calif. Various embodiments of network system 2 may include additional service nodes.

Network device 12 may also represent an access gateway in some instances, i.e., a layer 3 network edge device that manages subscriber sessions and routes data traffic to/from network 4. In such instances, network device 12 authenticates or receives authentication for device 10, authorizes the device 10 to access network 4, and may provide network configuration information to device 10. When device 10 attempts to attach to network system 2, network device 12 may authenticate the device by interfacing to a server using a AAA protocol, such as Remote Authentication Dial-In User Service (RADIUS) or the Diameter protocol, to authenticate the subscriber device or a user thereof. Network device 12 in such instances may comprise, for example, a GGSN, an edge router such as a BRAS, a CMTS, or another network device.

A network service provider that administers network system 2 may offer services on a per-subscriber basis to instances of device 10 that access the service provider network. Services offered may include, for example, traditional Internet access, Voice-over-Internet Protocol (VoIP), video and multimedia services, and security services. The network service provider may configure network system 2 to offer services to subscribers in accordance with one or more service level agreements (SLAs) that define network performance levels in a number of dimensions, including the type of offered services and corresponding service parameters (e.g., upstream/downstream bandwidth, reliability (e.g., up-time), security, quality of service, rate limits, and others). In this way, SLAs or other service agreements may govern communication between network system 2 and instances of device 10.

Device 10 may begin exchanging data packets with network 4, and such packets traverse network device 12 as members of at least one packet flow. The term "packet flow" refers to a set of packets originating from a particular source device and sent to a particular destination device as part of an application communication session between the source and destination device. A flow of packets, in either the upstream (sourced by device 10) or downstream (destined for device 10) direction, may be identified by the five-tuple: <source network address, destination network address, source port, destination port, protocol>. This five-tuple generally identifies a packet flow to which a received packet corresponds and, depending on the flow direction, a subscriber may be associated with either the source network address or the destination network address of the flow. In some instances, access network 6 may overload the five-tuple or a subset thereof with packet flows for multiple different subscribers and/or with multiple packet flows for the same subscriber. Packet flows may also be characterized and identified according to other characteristics, including VLAN tags, PPPoE session, and GTP tunnel identifiers of network layer or data link layer protocol headers/tags that encapsulate the packets. Network device 12 may identify an application using deep packet inspection (DPI).

Network device 12 sends and receives packets using physical network interface 14. Physical network interface 14 may represent a physical interface or port of a network interface card (NIC). Network device 12 is configured with one or more logical interfaces 16A-16N (collectively, "logical interfaces 16"). Logical interfaces 16 may be layer 2 logical interfaces. Each of logical interfaces 16 may use a different VLAN-ID as a virtual circuit identifier, and the scope of the VLAN-ID may be local to the physical network interface 14.

Logical interfaces 16 subdivide a physical unit (in this case physical network interface 14) into multiple logical units to provide flexible packet processing. Properties of the physical interface 14 are shared among logical interfaces 16. Each logical interface 16 has corresponding logical properties specific to that interface, such as protocol families running on the interface (including protocol-specific Maximum Transmission Units (MTUs)), IP address(es) associated with the interface, VLAN tags, and filters and/or routing policies operating on the interface.

In some examples, network device 12 is a distributed network device having an aggregation device and multiple satellite devices each having at least one connection to the aggregation device. The satellite devices provide interfaces that send and receive network traffic, which can be forwarded over the aggregation device. The aggregation device operates as the single point of management for all devices of the distributed network device.

For such examples, a cascade port is a physical interface on an aggregation device that provides a connection to a satellite device. A cascade port on an aggregation device connects to an uplink port on a satellite device. On an aggregation device, there may be one or more cascade port connections with a satellite device. For example, Aggregation device 1 may have one cascade port connection (CP1) to Satellite device 1, and Aggregation device 2 may have two cascade port connections (CP2 and CP3) to Satellite device 2.

When there are multiple cascade port connections to a satellite device, the traffic handled by the ports is automatically load-balanced. For a packet destined for a satellite device, the cascade port over which to forward the packet is chosen based on a per-packet hash that is computed using key fields in the packet.

An extended port is a network-facing port on a satellite device that transmits and received network traffic for the distributed network device. Network traffic received on an extended port is passed, when appropriate, to the aggregation device over the uplink port to cascade port link. Each network-facing port on a satellite device for a distributed network device is also an extended port. A single cascade port is associated with one or more extended ports.

Traffic sent between aggregation devices and satellite devices for a distributed network device instance of network device 12 is sent over a logical path, called an e-channel. The packets sent between an aggregation device and a satellite device include the E-channel tag (ETAG) header with an E-channel identifier (ECID). The ECID identifies the path that will be used in forwarding traffic packets. Each extended port is identified by a unique ECID value.

For unicast traffic and multicast traffic when local replication is disabled, the aggregation device assigns a unicast ECID value for each extended port. The aggregation device may create a virtual interface to represent the satellite device (e.g., sd-<fpc-id>/0/0) and use the virtual interface as the next-hop interface.

The multicast ECID value assignments are dynamically assigned by satellite devices. When the aggregation device requires a new multicast ECID value for a group of ports or if it needs to add a port to an existing ECID, the process is as follows: (1) The aggregation device sends a request to the satellite device for an ECID value that includes a reference ID. (2) The satellite device assigns an ECID value and adds an entry to its ECID table to map the ECID value to the extended ports. (3) The satellite device sends a message back to the aggregation device with the reference ID and the ECID value to use to represent the extended ports. (4) The aggregation device adds the information to its ECID table. It uses the virtual interface as the next-hop interface to send multicast traffic for those extended ports on the satellite device.

When the satellite device receives data packets with that ECID value, the satellite device can begin to replicate and forward packets to those extended ports. A cascade port may be configured with a corresponding logical interface 16. An extended port may be configured with layer 2 bridging protocols, integrating routing and bridging, and firewall filters.

In examples in which network device 12 is a distributed network device as described above, physical network interface 14 may be a cascade port and a logical interface 16 of physical network interface 14 of an aggregation device may correspond to the cascade port. Packets received at an extended port and forwarded to the cascade port for the extended port on an uplink may be processed using the logical interface 16 corresponding to the cascade port, and the ECID value for packets identify the extended port and can be used in combination with a destination MAC address as a lookup to a my-MAC table 17 configured for the cascade port/corresponding logical interface 16. Logical interface 16 processing may include layer 3 routing on a network 4, which may include routing on a layer 3 VPN, for routable layer 3 packets having a layer 2 header having a destination MAC address that is a MAC address for the layer 3 routing interface for the logical interface 16.

In some examples, network device 12 is an access device for subscriber devices, e.g., network device 10, and supports subscriber management. Subscriber management supports the creation of service interfaces over point-to-point MPLS pseudowires. The pseudowire service interface capability enables service providers to extend an MPLS domain from the access-aggregation network 6 to the network 4 service edge, where subscriber management is performed. Service providers can take advantage of MPLS capabilities such as failover, rerouting, and uniform MPLS label provisioning, while using a single pseudowire to service a large number of DHCP and PPPoE subscribers in the service network.

The pseudowire is a tunnel that is either an MPLS-based Layer 2 VPN or Layer 2 circuit. The pseudowire tunnel transports Ethernet encapsulated traffic from an access node (for example, a DSLAM or other aggregation device) to a router that hosts the subscriber management services. The termination of the pseudowire tunnel on network device 12 may be similar to a physical Ethernet termination, and is the point at which subscriber management functions are performed. A service provider can configure multiple pseudowires on a per-DSLAM basis and then provision support for a large number of subscribers on a specific pseudowire.

At the access node end of the pseudowire, the subscriber traffic can be groomed into the pseudowire in a variety of ways, limited only by the number and types of interfaces that can be stacked on the pseudowire. A configured anchor point identifies the logical tunnel interface that terminates the pseudowire tunnel at the access node, network device 12 in this example.

The pseudowire is a virtual device that is stacked above the logical tunnel anchor point on the physical interface (the "IFD" (interface device)), and supports a circuit-oriented Layer 2 protocol (either Layer 2 VPN or Layer 2 circuit). The Layer 2 protocol provides the transport and service logical interfaces, and supports the protocol family (IPv4, IPv6, or PPPoE).

The pseudowire configuration is transparent to the subscriber management applications and has little or no impact on the packet payloads that are used for subscriber management. Subscriber applications such as Dynamic Host Configuration Protocol (DHCP) and Point-to-Point Protocol over Ethernet (PPPoE) can be stacked over Layer 2 similar to the way in which they are stacked over a physical interface.

In examples in which network device 12 is an access network device as described above, logical interfaces 16 of physical network interface 14 may correspond to pseudowire service (PS) interfaces or logical tunnel (LT) interfaces. Logical interface 16 processing may include layer 3 routing on a network 4, which may include routing on a layer 3 VPN, for routable layer 3 packets having a layer 2 header having a destination MAC address that is a MAC address for the layer 3 routing interface for the logical interface 16.

In some examples, network device 12 is one of a plurality of routers and tracks redundant virtual router redundancy protocol (VRRP) sessions using separate logical interfaces 16. VRRP is a logical interface-specific configuration feature for network device 12. In general, VRRP allows two routers to share the same virtual MAC address and IP address, which allows hosts to use the same virtual MAC/IP address combination as the default gateway to network 4. Only one of the routers stays active at any one time, with the active router functioning as the default gateway. However, if the active router dies, the standby router assumes the role of the active router and default gateway, still advertising the same virtual MAC/IP address combination. The virtual MAC/IP address combination is a logical entity.

In examples in which network device 12 has VRRP sessions using separate interfaces 16, the VRRP interfaces for the VRRP sessions are configured on different VLANs and different logical interfaces 16. Each of the VRRP sessions may use the same virtual MAC as the gateway MAC for identifying layer 3 routable traffic.

In accordance with techniques of this disclosure, logical interfaces 16A-16N are configured with respective my-MAC tables 17A-17N for applying corresponding my-MAC checks to packets 7 received on the logical interfaces. In some examples, a logical interface 16 may be configured with multiple my-MAC tables corresponding to different applications running on the logical interface. Each of my-MAC tables 17 stores one or more MAC addresses usable for identifying at least some of layer 3 packets 7 as routable on a layer 3 network and, conversely, identifying at least some of packets 7 as non-routable and therefore to be dropped due to my-MAC check failure.

Network device 12 applies my-MAC checks to packets 7 ingressing at logical interfaces 16 using the my-MAC tables configured for the logical interfaces 16. For example, network device 12 applies a my-MAC check using my-MAC table 17A to packets 7 received at logical interface 16A. Network device 12 applies a my-MAC check using my-MAC table 17N to packets 7 received at logical interface 16N. To apply the my-MAC check, if the my-MAC table 17 for a corresponding logical interface 16 on which a packet 7 is received stores a MAC address that is the destination MAC address of the packet 7, network device 16 continues processing the packet 7, which may include routing the packet on a layer 3 network such as network 4; otherwise, network device 12 drops the packets because the my-MAC check failed.

The techniques may include assigning one or more MAC addresses per logical interface identifier using my-MAC tables 17 configured for the logical interfaces, and applying my-MAC checks for pseudo/logical tunnel interfaces on the fly. In some cases, the techniques apply my-MAC checks on a per-logical interface 16 basis without applying my-MAC checks for the physical network interface 14.

In this way, network device 12 can drop a packet if the packet passes or avoids a my-MAC check for the physical interface 14 but is nevertheless not destined for a layer 3 routing interface for a logical interface 16. Network device 12 thus validates destination MAC addresses for packets 7 on a per-logical interface basis.

Figure 2:
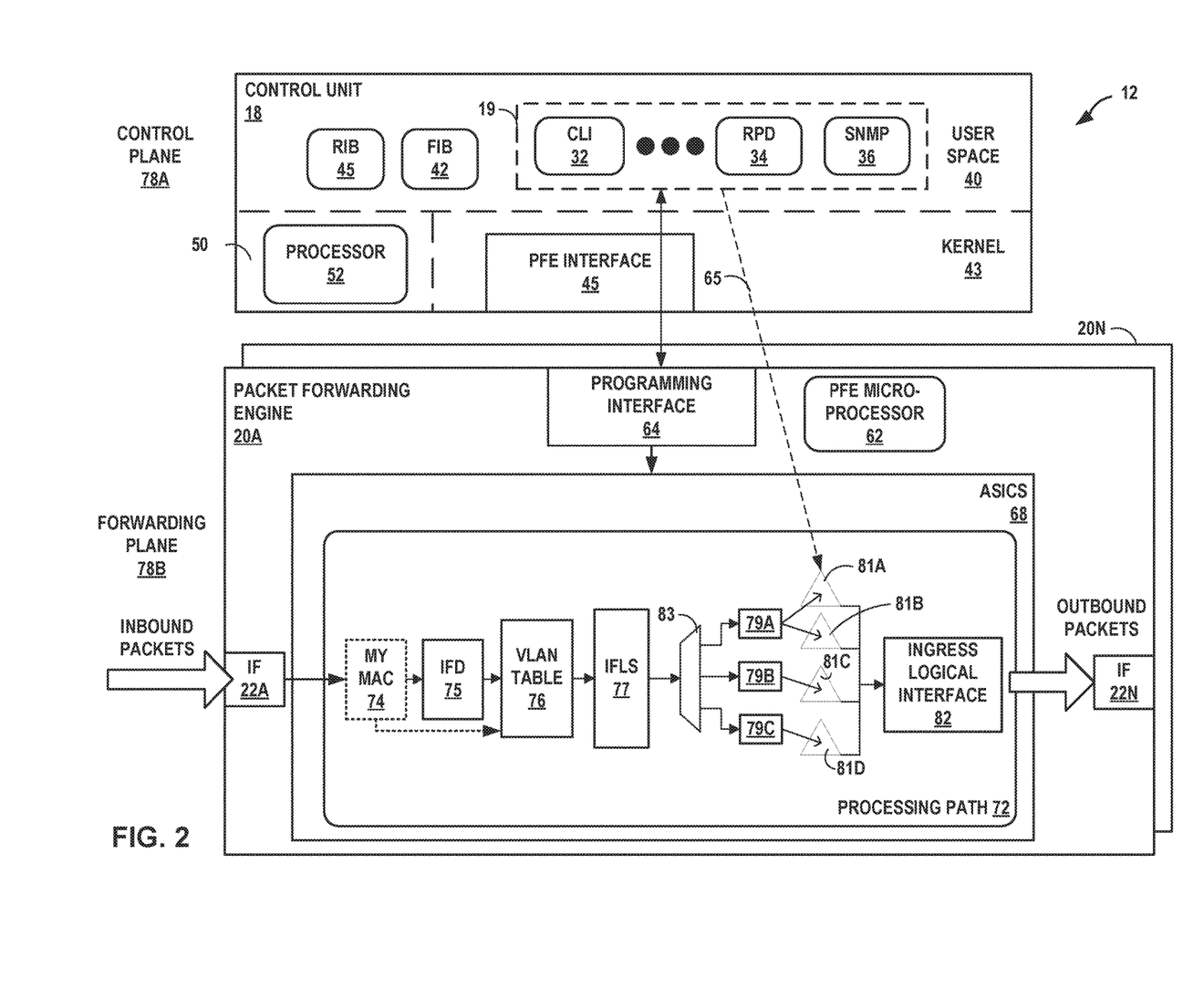
FIG. 2 is a block diagram illustrating, in further detail, an example instance of network device 12 that validates destination MAC addresses for packets on a per-logical interface basis in accordance with the described techniques.

FIG. 2 is a block diagram illustrating, in further detail, an example instance of network device 12 that validates L2 network addresses (e.g., destination MAC addresses) for packets on a per-logical interface basis in accordance with the described techniques. Network device 12 may comprise a router such as a provider edge or customer edge router, or another type of network device, such as a switch.

In this example, network device 12 includes a control unit 18 that provides control plane 78A functionality for the device. Control unit 18 may be distributed among multiple entities, such as one or more routing units and one or more service cards insertable into a chassis. In such instances, network device 12 may therefore have multiple control planes. Network device 12 also includes a plurality of forwarding components in the form of packet forwarding engines 20A-20N ("PFEs 20") and a switch fabric 26 that together provide a forwarding plane 78B for forwarding and otherwise processing subscriber traffic. Other types of forwarding components may include packet processors, ASIC-based packet processors, or other specialized hardware that executes software for processing and forwarding packets. PFEs 20 receive and send data packets via physical interfaces 22A-22N of interface cards each associated with a respective one of PFEs 20. Each of PFEs 20 and its associated ones of IFCs 22 may reside on a separate line card for network device 12 (not shown). Example line cards include flexible programmable integrated circuit (PIC) concentrators (PFCs), dense port concentrators (DPCs), and modular port concentrators (MPCs). Each of interfaces 22 may support one of a variety layer two (L2) technologies, including Ethernet, Gigabit Ethernet (GigE), and Synchronous Optical Networking (SONET) interfaces. A switch fabric (not shown) provides a high-speed interconnect for forwarding incoming data packets to the selected one of PFEs 20 for output over a network.

Control unit 18 is connected to each of PFEs 20 by internal communication links. Internal communication links may comprise a 100 Mbps or 1 Gbps Ethernet connection, for instance. Daemons 19 executed by control unit 18 are user-level processes that run network management software, execute routing protocols to communicate with peer routing devices, execute configuration commands received from an administrator, maintain and update one or more routing tables, manage subscriber flow processing, and create one or more forwarding tables for installation to PFEs 20, among other functions. Daemons 19 in this example include command line interface (CLI) 32, routing protocol daemon (RPD) 34, and Simple Network Management Protocol (SNMP) daemon 36. In this respect, control plane 78A may provide routing plane, service plane, and management plane functionality for network device 12. Various instances of control unit 12 may include additional daemons 14 not shown in FIG. 2 that perform other control, management, or service plane functionality and/or drive and otherwise manage forwarding plane functionality for network device 12. Control unit 12 may in some instances represent a control unit of a service card or a combination of control units of a routing unit that provides routing plane functionality and a service card.

Daemons 14 operate over and interact with kernel 43, which provides a run-time operating environment for user-level processes. Kernel 43 may comprise, for example, a UNIX operating system derivative such as Linux or Berkeley Software Distribution (BSD). Kernel 43 offers libraries and drivers by which daemons 14 may interact with the underlying system. PFE interface 45 of kernel 43 comprises a kernel-level library by which daemons 14 and other user-level processes or user-level libraries may interact with programming interface 64 of PFE 20A. PFE interface 45 may include, for example, a sockets library for communicating with PFE 20A over dedicated network links.

Hardware environment 50 of control unit 18 comprises one or more processors 52 that execute software instructions, such as those used to define a software or computer program including both kernel 43 and user space 40, stored to a computer-readable storage medium (not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors 52 to perform techniques described herein. Alternatively, or in addition, control unit 18 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 34 executes one or more interior and/or exterior routing protocols to exchange routing information with other network devices and store received routing information in routing information base 45 ("RIB 45"). RIB 45 may include information defining a topology of a network, including one or more routing tables and/or link-state databases. RPD 34 resolves the topology defined by routing information in RIB 45 to select or determine one or more active routes through the network and then installs these routes to forwarding information base 42 ("FIB 42"). Typically, RPD 34 generates FIB 42 in the form of a radix or other lookup tree to map packet information (e.g., header information having destination information and/or a label stack) to next hops and ultimately to interface ports 22 of interface cards associated with respective PFEs 20.

Command line interface daemon 32 ("CLI 32") provides a shell by which an administrator or other management entity may modify the configuration of network device 12 using text-based commands. Simple Network Management Protocol daemon 36 ("SNMP 36") comprises an SNMP agent that receives SNMP commands from a management entity to set and retrieve configuration and management information for network device 12. Using CLI 32 and SNMP 36, for example, management entities may enable/disable and configure services, manage classifications and class of service for packet flows, install routes, enable/disable and configure rate limiters, configure traffic bearers for mobile networks, and configure interfaces, for example. RPD 34, CLI 32, and SNMP 36 in this example configure forwarding plane 78B via PFE interface 45.

PFEs 20 process packets by performing a series of operations on each packet over respective internal packet processing paths as the packets traverse the internal architecture of network device 12. Operations may be performed, for example, on each packet by any of a corresponding ingress interface, an ingress PFE 20, an anchor PFE 20, an egress PFE 20, an egress interface or other components of network device 12 to which the packet is directed prior, such as one or more service cards. PFEs 20 each include instructions that, when executed, examine the contents of each packet (or another packet property, e.g., incoming interface) and on that basis make forwarding decisions, apply filters, and/or perform accounting, management, traffic analysis, class of service decisions, lawful intercept, and load balancing, for example. In one example, each of PFEs 20 arranges instructions as next hop data that can be chained together as a series of "hops" along an internal packet processing path for the service node. The result of packet processing determines the manner in which a packet is forwarded or otherwise processed by PFEs 20 from its input physical interface 22 to its output physical interface 22. A particular packet may be processed by multiple PFEs 20.

PFE interface 45 presents an interface by which daemons 19 may configure PFEs 20 with instructions for processing packet flows. Daemons 19 direct PFEs 20 via PFE interface 45 to install IFLs 77 with which PFEs 20 process packet flows. Each of PFEs 20 may include zero or more IFLs 77. PFE interface 45 may comprise one or more user- or kernel-level libraries, programs, toolkits, application programming interfaces (APIs) and may communicate control and data messages to PFEs 20 via internal communication links using sockets, for instance.

For example, CLI 32 may execute a command line interface that receives, from a user, a logical interface configuration for a physical network interface. The logical interface configuration may include configuration data for a pseudowire service interface, logical tunnel interface, logical interface to support VRRP sessions, or distributed network device configuration for one or more cascade ports, as described above with respect to FIG. 1. In response, daemons 19 invoke PFE interface 45 to configure the packet forwarding path to implement the logical interface configuration.

PFE interface 45 allows daemons 19 to drive the installation and configuration of packet processing path 72 of PFE 20A. In particular, PFE interface 45 includes an application programming interface (API) by which daemons 19 may configure processing path 72 with interfaces and instructions and map packet flows to logical interfaces for processing.

PFE 20A, in combination with other PFEs 20 of network device 12, implements forwarding plane 78B (also known as a "data plane") functionality to handle packet processing from ingress interfaces on which packets are received to egress interfaces to which packets are sent. Forwarding plane 78B determines data packet forwarding through network device 12, applies services, rate limits packet flows, filters packets, and otherwise processes the packets using instructions and lookup data installed by control plane 78A to forwarding plane 78B. While FIG. 2 illustrates only PFE 20A in detail, each of PFEs 20 of network device 12 comprises similar modules that perform substantially similar functionality.

PFE 20A includes application-specific integrated circuit (ASIC)-based packet processors ("ASICs 68") that map packets internal forwarding paths of processing path 72 and execute processing path 72 in accordance with techniques described herein. ASICs 68 include one or more programmable application-specific integrated circuits having key engines that execute microcode (or "microinstructions") to control and apply fixed hardware components of ASICs 68 to process packet "keys." A packet key includes packet fields and other parameters that determine a flow of packet processing for the packet along an internal processing path configured in processing path 72. Key engines include key buffers to store packet field data for corresponding packets that the key engine is currently processing. Key buffers may also provide limited writable memory to which elements of the internal processing path may write to pass messages accessible by future elements. Some instances of ASICs 68 may include a plurality of key engines each having an associated key buffer and record buffer.

PFE microprocessor 62 manages ASICs 68 and executes programming interface 64 to provide an interface for/to control unit 18. PFE microprocessor 62 may execute a microkernel to provide an operating environment programming interface 64 and other software. Programming interface 64 receives messages from control unit 18 directing packet forwarding engine 20A to configure the elements of processing path 72.

Internal processing path 72 ("processing path 72") of ASICs 68 comprises elements including programmable, executable microcode and fixed hardware components that determine the packet processing actions and other operations performed by ASICs 68. Processing path 72 may include, for example, executable instructions, programmable logic, and application-specific logic that perform lookups, rate limit packet flows, count packets, implement classes of service, perform lawful intercept, classify packets, apply filters, route packets, and manipulate packet keys, among other functions. PFE 20A may store executable instructions of processing path 72 in computer-readable storage media, such as static random access memory (SRAM). While illustrated within ASICs 68, executable instructions of processing path 72 may be stored in memory external to ASICs 68 onboard PFE 20A.

In some aspects, one or more instructions of processing path 72 comprise a next hop data structure to initiate processing. At the end of each processing step by ASICs 68, the result is a next hop that may specify additional processing or the termination of processing, for instance. In addition, next hops may specify one or more functions to be executed by ASICs 68 and/or one or more hardware elements to be applied (e.g., policers). Next hops thus form the primary data structure that can be used to initiate a service, chain next hops to allow for multiple processing steps to be performed with respect to a single packet, and terminate an internal processing path.

In the illustrated example, processing path 72 includes elements in the form of executable instructions and lookup data structures, in some cases configured as interfaces, that define processing paths for packets received at a particular physical network interface 22A. Processing path 72 includes my-MAC check 74 ("My MAC 74"), device interface (IFD) 75, VLAN table 76, logical interfaces 77, a selector block 83, and logical interface-specific my-MAC checks 79A-79C each associated with one or more my-MAC tables 81A-81D.

My-MAC check 74 represents functionality configured to perform an optional operation configured for processing packets received at the physical network interface 22A associated with physical device interface 75. In general, a my-MAC check operation validates a destination MAC address of a packet against an expected MAC address for the physical interface. My-MAC check 74 is an optional (indicated by dashed lines) operation for validating inbound packets against the MAC address for the physical network interface and processed in part using device interface 75.

Device interface 75 may include device-specific instructions for the physical network interface 22A for processing all packets received at physical network interface 22A and that pass or skip the optional my-MAC check 74.

VLAN table 76 of FIG. 2 represents functionality configured to access is a list of one or more VLAN-IDs that each maps to a logical interface 77 configured for the physical network interface 22A and device interface 75. The VLAN-IDs may represent Customer VLANs (C-VLANs) or Service or Subscriber VLANs (S-VLANs) in some examples. ASICs 68 process packets received at physical interface 22A by querying VLAN table 76 using VLAN tags included in the packets to identify the appropriate IFL 77 with which to process the packet.

Logical interfaces 77 ("IFLs 77") represents one or more logical interfaces for which ASICs 68 are configured to apply logical interface-specific operations to packets mapped to the logical interfaces. For example, a logical interface 77A may be configured to be associated with VLAN-ID 3. ASICs 68 processes packets received at physical interface 22A using logical interface 77A. Each of IFLs 77 has corresponding logical properties specific to that interface, such as protocol families running on the interface (including protocol-specific Maximum Transmission Units (MTUs)), IP address(es) associated with the interface, VLAN tags, and filters and/or routing policies operating on the interface.

The number of IFLs 77 may be limited in various implementations of PFE 20A due to memory restrictions, the rate at which PFE microprocessor 62 can establish paths in processing path 72, the bandwidth between control unit 18 and PFE 20A, and the rate at which control unit 18 can allocate instructions and determine paths in processing path 72. Each of IFLs 77 represents a logical interface to an interface-specific processing path of processing paths 72 for execution by ASICs 68.

In accordance with techniques of this disclosure, processing path 72 is further configured to execute selector block 83 and logical interface-specific my-MAC checks 79A-79C each associated with one or more my-MAC tables 81A-81D. PFE 20A configures my-MAC checks 79 for one of IFLs 77, e.g., IFL 77A. Different my-MAC checks 79 correspond to different types of logical interfaces for the physical network interface 22A and configured for the IFL 77A. For example, my-MAC check 79A may be for a logical tunnel or pseudowire service interface, my-MAC check 79B may be for a cascade port, and my-MAC check 79C may be for a logical interface that supports VRRP. The number and type of my-MAC checks 79 for an IFL 77 may vary, depending for instance on whether the IFL 77 is configured to support the corresponding application for a type of my-MAC check.

Selector block 83 determines, based on properties of a received packet, the type of logical interface for the packet and selects the appropriate one of my-MAC checks 79 (and corresponding my-MAC tables 81) to apply to the received packet. Selector block 83 may determine that the received packet is for a logical tunnel, pseudowire service, VRRP session, cascade port of a distributed network device, or other type of logical interface for the packet. In this way, selector block 83 allows for multiple different types of logical interfaces for IFLs 77 and corresponding valid MAC addresses for each type of logical interface. For example, my-MAC check 79B may be for a cascade port, and selector block 83 may determine from fields of the packet (e.g., an ETAG header including an ECID) that the packet was received at a cascade port on an uplink from a satellite device. Selector block 83 may alternatively determine from fields of the packet that the packet is for a VRRP session, a logical tunnel, pseudowire service, or other type of logical interface and perform the corresponding my-MAC check 79 for that type with the corresponding my-MAC table(s) 81.

Each of my-MAC checks 79 uses one or more my-MAC tables 81A-81D as a lookup table to validate received packets on a per-logical interface basis. Applications executing on control unit 18 may configure, using configuration messages 65, each of the my-MAC tables 81 with one or more MAC addresses. The MAC addresses are valid destination MAC addresses for layer 3 packets received on the corresponding IFL 77 in that such packets are destined for a MAC address for the layer 3 interface for the logical interface. For example, ASICs 68 apply my-MAC check 79B operation to packets using my-MAC table 81C. If the destination MAC of a packet matches one of the MAC addresses in my-MAC table 81C, ASICs 68 continue processing the packet using ingress logical interface 82 and, in some cases, additional elements of processing path 72 (not shown). If the destination MAC of the packet does not match one of the MAC addresses in my-MAC table 81C, then ASICs 68 drop the packet.

Some IFLs 77 may have multiple associated VLANs or multiple associated ECIDs, for example to support different VRRP sessions or extended ports. In such cases, the my-MAC checks 79 for such an IFL 77 may use my-MAC tables 81 corresponding to the different VLANs or extended ports. The different my-MAC tables 81 correspond in this case to different logical interface identifiers. A logical interface identifier can be an IFL index, a tunnel endpoint of a layer 2 VPN, an extended port identifier (e.g., ECID), and/or a VLAN-ID. Logical interface identifiers can be a combination of any two or more of the above. In the example of FIG. 2, my-MAC check 79A has two associated my-MAC tables 81A, 81B for different VLANs or different ECIDs. My-MAC check 79A therefore uses the my-MAC table 81A, 81B that is for the logical interface identifier indicated by the packet when applying a my-MAC check to the packet. In some cases, rather than having separate my-MAC tables 81 for each logical interface identifier, the logical interface identifier is used in combination with the destination MAC address of a packet as the lookup key to a my-MAC table 81 that stores valid MAC addresses for multiple different logical interface identifiers.

Configuration messages 65 specify valid MAC addresses for logical interface identifiers for installation to my-MAC tables 81 for the logical interface identifiers. Control unit 18 sends configuration messages 65 to PFE 20A via PFE interface 45 to install the valid MAC addresses to the my-MAC tables 81 for use with logical interface-specific my-MAC checks.

In some examples, the control plane of network device 12 configures my-MAC checks using a common my-MAC configuration message format for IFLs 77 that are to have a my-MAC check performed using a MAC per IFL 77 or that are to have dynamic my-MAC validation ("on the fly"). The configuration message 65 may include the MAC address(es), a logical interface identifier, and a flag. The flag specifies the type of logical interface identifier. For example, if the flag is equal to 'FUSION' then a my-MAC table 81 may be attached per cascade port and the key to my-MAC table 17 may be a combination of extended port identifier (e.g., ECID—the logical interface identifier) and MAC address. If the flag is 'LOGICAL TUNNEL' then the my-MAC table 81 may be per-logical tunnel endpoint as the logical interface identifier. If the flag is 'default' or unset, then the my-MAC table 81 is per-IFL 77 or per-VLAN ID.

Programming interface 64 configures my-MAC tables 81 per logical interface identifier according to the configuration messages 65 in such examples. The network device 12 forwarding plane executes the hardware my-MAC tables 81 in the ASICs 68 during fast path execution before anything is executed on the ingress logical interface 82 with respect to packets received on an IFL 77. The result of execution of this table will tell whether the packet is destined to a layer 3 interface of network device 12 or not based on the entry availability in the table, i.e., whether the destination MAC of the packet is stored by a my-MAC table 81 for the logical interface at which the packet is received.

Network device 12 may be configured with MACs (in this case, virtual MACs or "VMACs") per-IFL 77, and performing my-MAC checks on a per-logical interface level may improve the ability of the VRRP application (or other application) to scale at a per-IFL 77 level. For example, in contrast to virtual MAC assignment at the physical interface level, the techniques may allow the network device 12 to continue receiving traffic destined for an assigned MAC at one of the IFLs 77 even when the other IFLs 77 has been deleted, added, or restored, triggering the deletion of the assigned MAC from the other IFL 77. Using the described techniques, the network device 12 may continue to identify routable traffic for the VRRP application.

Figure 3:
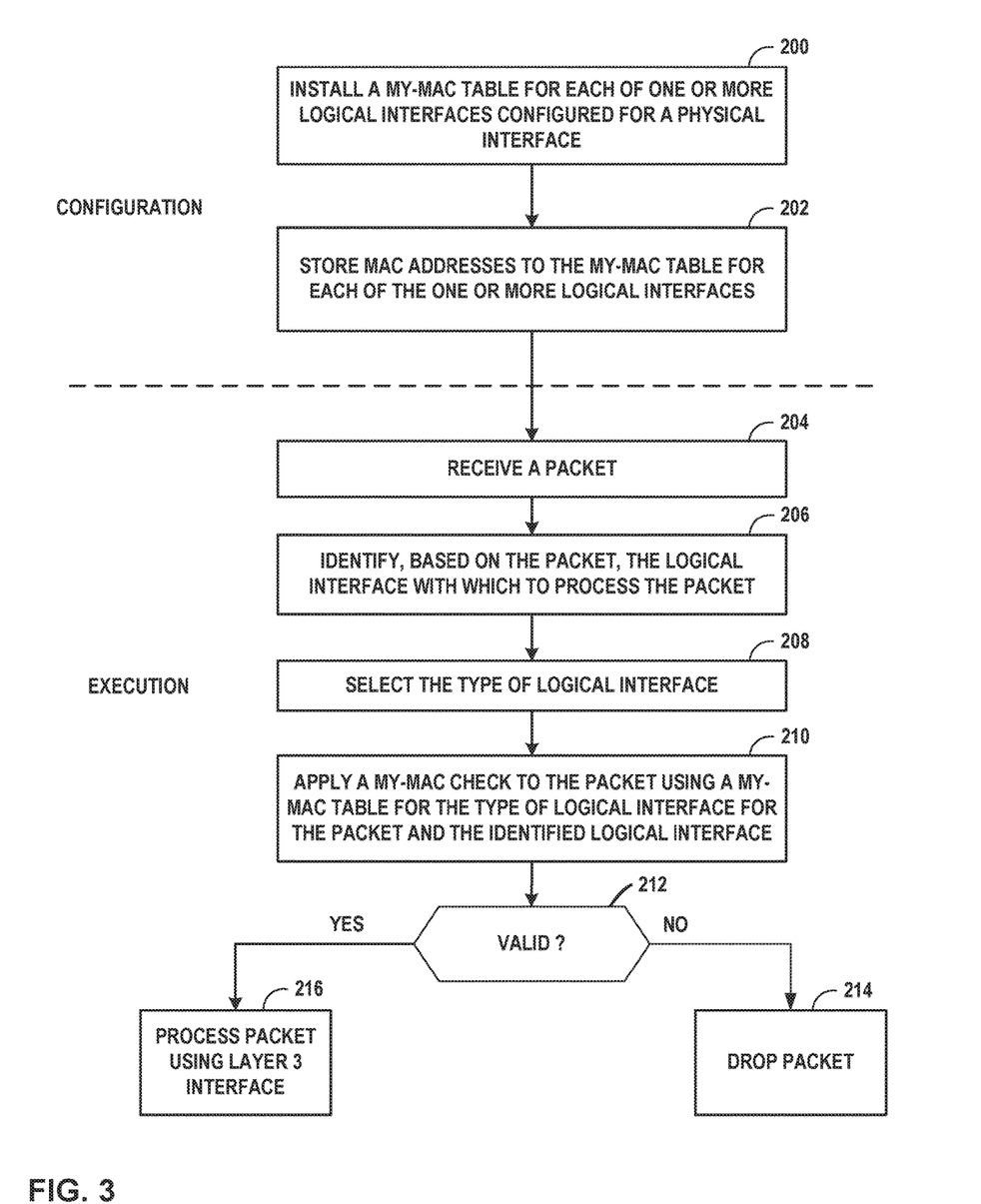
FIG. 3 is a flowchart illustrating an example mode of operation of network device 12 of FIG. 2 to validate destination MAC addresses of layer 3 packets on a per-logical interface basis, according to techniques described herein.

FIG. 3 is a flowchart illustrating an example mode of operation of network device 12 of FIG. 2 to validate destination MAC addresses of layer 3 packets on a per-logical interface basis, according to techniques described herein. One or more applications executing on control unit 18 configures logical interfaces, IFLs 77, for one or more physical interfaces 22 (such as physical interface 22A) and installs a my-MAC table 81 for each of the IFLs 77 (200). The applications determine MAC addresses for layer 3 interfaces associated to the IFLs 77, which may be different MAC addresses for each of the IFLs 77, and install the MAC addresses to the corresponding my-MAC tables 81 for the IFLs 77 using one or more configuration messages 65 (202).

Network device 12 receives a packet at physical interface 22A (204). Based at least on one or more fields of the packet, PFE 20A determines the IFL 77 with which to process the packet (206), and PFE 20A executing selector block 83 selects the type of logical interface for the packet based at least on one or more fields of the packet (208). Based on the determined IFL 77 and the selected type of logical interface, PFE 20A applies one of my-MAC checks 79 using the corresponding my-MAC table 81 for the my-MAC check 79.

If the my-MAC check 79 determines that the destination MAC address for the packet matches one of the MAC addresses in the corresponding my-MAC table 81 (YES branch of 212), the packet is valid and the PFE 20A continues processing the packet, which my include forwarding the packet on a layer 3 interface for the identified IFL 77 (216). Otherwise (NO branch of 212), PFE 20A drops the packet (214).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
receiving, by a network device, configuration data defining a plurality of logical interfaces for a physical network interface of the network device, wherein each logical interface of the plurality of logical interfaces is associated with a different my-media access control (my-MAC) table configured within the network device, each of the my-MAC tables including one or more valid MAC addresses for the logical interface;
identifying, by the network device, a logical interface of the plurality of logical interfaces with which to process a packet received by the network device at the physical interface,
wherein the identified logical interface comprises a logical tunnel or a pseudowire service interface having a layer 3 tunnel endpoint, and
wherein the one or more valid MAC addresses for the identified logical interface comprise one or more MAC addresses that indicate routable layer 3 traffic at a layer 3 tunnel endpoint; and
in response to determining, by the network device, that the my-MAC table associated with the identified logical interface does not include a valid MAC address for the identified logical interface that matches a destination MAC address of the packet, dropping the packet.

2. The method of claim 1, wherein the packet is a first packet, the method further comprising:
identifying, by the network device, the logical interface with which to process a second packet received by the network device at the physical interface;
in response to determining, by the network device, that the my-MAC table associated with the identified logical interface includes a valid MAC address that matches a destination MAC address of the second packet, forwarding the second packet.

3. The method of claim 1, wherein forwarding the second packet comprises forwarding the packet using a layer 3 interface configured for the identified logical interface.

4. The method of claim 1,
wherein the logical interface is a first logical interface, and
wherein the packet is a first packet, the method further comprising:
identifying, by the network device, a second logical interface of the plurality of logical interfaces with which to process a second packet received by the network device at the physical interface;
in response to determining, by the network device, that the my-MAC table associated with the identified second logical interface includes a valid MAC address that matches a destination MAC address of the second packet, forwarding the second packet.

5. The method of claim 1,
wherein the logical interface is a first logical interface,
wherein the my-MAC table associated with the first logical interface comprises a first MAC address, and
wherein the my-MAC table associated with a second logical interface of the plurality of logical interfaces comprises a second MAC address, the second MAC address different than the first MAC address.

6. The method of claim 1,
wherein the plurality of logical interfaces are configured with respective virtual local area network identifiers, and
wherein identifying the logical interface comprises mapping a virtual local area network tag of the packet to the virtual local area network identifier configured for the identified logical interface.

7. The method of claim 1, further comprising:
sending, from a control unit of the network device to a forwarding component of the network device, a configuration message specifying the identified logical interface and a valid MAC address for the my-MAC table associated with the identified logical interface; and
storing, by the forwarding component, the valid MAC address to the my-MAC table associated with the identified logical interface,
wherein the valid MAC address does not match the destination MAC address of the packet.

8. The method of claim 1,
wherein each of the plurality of logical interfaces is a type of logical interface, the method further comprising:
selecting, by the network device based on the packet, a type of logical interface for the packet,
wherein determining that the my-MAC table associated with the identified logical interface does not include a valid MAC address for the identified logical interface that matches a destination MAC address of the packet comprises querying the my-MAC table associated with the identified logical interface using a lookup key that is based on the type of logical interface for the packet and the destination MAC address of the packet.

9. A method comprising:
receiving, by a network device, configuration data defining a plurality of logical interfaces for a physical network interface of the network device, wherein each logical interface of the plurality of logical interfaces is associated with a different my-media access control (my-MAC) table configured within the network device, each of the my-MAC tables including one or more valid MAC addresses for the logical interface, wherein the network device comprises a distributed network device having an aggregation device having a cascade port and one or more satellite devices each having at least one extended port configured for the cascade port;
identifying, by the network device, a logical interface of the plurality of logical interfaces with which to process a packet received by the network device at the physical interface, wherein the identified logical interface represents the cascade port; and
in response to determining, by the network device, that the my-MAC table associated with the identified logical interface does not include a valid MAC address for the identified logical interface that matches a destination MAC address of the packet, dropping the packet,
wherein determining that the my-MAC table associated with the identified logical interface does not include a valid MAC address for the identified logical interface that matches a destination MAC address of the packet comprises querying the my-MAC table associated with the identified logical interface using a lookup key that is based on an E-channel identifier (ECID) and the destination MAC address of the packet.

10. A method comprising:
receiving, by a network device, configuration data defining a plurality of logical interfaces for a physical network interface of the network device, wherein each logical interface of the plurality of logical interfaces is associated with a different my-media access control (my-MAC) table configured within the network device, each of the my-MAC tables including one or more valid MAC addresses for the logical interface;

identifying, by the network device, a logical interface of the plurality of logical interfaces with which to process a packet received by the network device at the physical interface, wherein the identified logical interface is configured to support a first virtual router redundancy protocol (VRRP) session and a second VRRP session for a VRRP group; and in response to determining, by the network device, that the my-MAC table associated with the identified logical interface does not include a valid MAC address for the identified logical interface that matches a destination MAC address of the packet, dropping the packet, wherein the one or more valid MAC addresses for the identified logical interface comprise one or more virtual MAC addresses that indicate routable layer 3 traffic for the VRRP group.

11. A network device comprising:

an interface card comprising a physical network interface;

a forwarding component associated with the interface card;

a control unit comprising one or more processors, wherein the control unit is configured to program the forwarding component to configure sets of one or more valid media access control (MAC) addresses in association with respective logical interfaces of a plurality of logical interfaces configured for the physical interface;

wherein the forwarding component is configured to identify a logical interface of the plurality of logical interfaces with which to process a packet received by the network device at the physical interface, wherein the identified logical interface comprises a logical tunnel or a pseudowire service interface having a layer 3 tunnel endpoint, and wherein the one or more valid MAC addresses for the identified logical interface comprise one or more MAC addresses that indicate routable layer 3 traffic at a layer 3 tunnel endpoint; and wherein the forwarding component is configured to, in response to a determination that the set of valid MAC addresses associated with the identified logical interface does not include a valid MAC address that matches a destination MAC address of the packet, drop the packet.

12. The network device of claim 11, wherein the control unit is configured to program the forwarding component with a plurality of my-MAC tables, and wherein each logical interface of the plurality of logical interfaces is associated with a different my-MAC table of the my-MAC tables, the my-MAC table associated with the logical interface storing the set of one or more valid MAC address associated with the logical interface.

13. The network device of claim 11, wherein the network device comprises a layer 3 gateway router.

14. The network device of claim 11, wherein the packet is a first packet, wherein the forwarding component is configured to identify the logical interface with which to process a second packet received by the network device at the physical interface, and wherein the forwarding component is configured to, in response to a determination that the set of valid MAC addresses associated with the identified logical interface includes a valid MAC address that matches a destination MAC address of the second packet, forwarding the second packet.

15. The network device of claim 11, wherein to forward the second packet the forwarding component is configured to forward the packet using a layer 3 interface configured for the identified logical interface.

16. The network device of claim 11, wherein the logical interface is a first logical interface, and wherein the packet is a first packet, wherein the forwarding component is configured to identify a second logical interface of the plurality of logical interfaces with which to process a second packet received by the network device at the physical interface;

wherein the forwarding component is configured to, in response to a determination that the set of one or more valid MAC addresses associated with the identified second logical interface includes a valid MAC address that matches a destination MAC address of the second packet, forward the second packet.

17. The network device of claim 11, wherein the logical interface is a first logical interface, wherein the set of valid MAC addresses associated with the first logical interface comprises a first MAC address, and wherein the set of valid MAC addresses associated with a second logical interface of the plurality of logical interfaces comprises a second MAC address, the second MAC address different than the first MAC address.

18. The network device of claim 11, wherein the plurality of logical interfaces are configured with respective virtual local area network identifiers, and wherein, to identify the logical interface, the forwarding component is configured to map a virtual local area network tag of the packet to the virtual local area network identifier configured for the identified logical interface.

19. A network device comprising:

an interface card comprising a physical network interface;

a forwarding component associated with the interface card;

a control unit comprising one or more processors, wherein the control unit is configured to program the forwarding component to configure sets of one or more valid media access control (MAC) addresses in association with respective logical interfaces of a plurality of logical interfaces configured for the physical interface, wherein the network device comprises a distributed network device having an aggregation device having a cascade port and one or more satellite devices each having at least one extended port configured for the cascade port;

wherein the forwarding component is configured to identify a logical interface of the plurality of logical interfaces with which to process a packet received by the network device at the physical interface, wherein the identified logical interface represents the cascade port; and wherein the forwarding component is configured to, in response to a determination that the set of valid MAC addresses associated with the identified logical interface does not include a valid MAC address that matches a destination MAC address of the packet, drop the packet, wherein determining that the my-MAC table associated with the identified logical interface does not include a valid MAC address for the identified logical interface that matches a destination MAC address of the packet comprises querying the my-MAC table associated with the identified logical interface using a lookup key that is based on an E-channel identifier (ECID) and the destination MAC address of the packet.

20. A network device comprising:

an interface card comprising a physical network interface;

a forwarding component associated with the interface card;

a control unit comprising one or more processors, wherein the control unit is configured to program the forwarding component to configure sets of one or more valid media access control (MAC) addresses in association with respective logical interfaces of a plurality of logical interfaces configured for the physical interface;

wherein the forwarding component is configured to identify a logical interface of the plurality of logical interfaces with which to process a packet received by the network device at the physical interface, wherein the identified logical interface is configured to support a first virtual router redundancy protocol (VRRP) session and a second VRRP session for a VRRP group; and wherein the forwarding component is configured to, in response to a determination that the set of valid MAC addresses associated with the identified logical interface does not include a valid MAC address for the identified logical interface that matches a destination MAC address of the packet, drop the packet, wherein the one or more valid MAC addresses for the identified logical interface comprise one or more virtual MAC addresses that indicate routable layer 3 traffic for the VRRP group.

* * * * *